United States Patent
Desbois et al.

(10) Patent No.: US 10,661,482 B2
(45) Date of Patent: May 26, 2020

(54) METHOD FOR PRODUCING FIBER-REINFORCED COMPONENTS OR SEMI-FINISHED PRODUCTS

(71) Applicants: BASF SE, Ludwigshafen am Rhein (DE); VOLKSWAGEN AG, Wolfsburg (DE)

(72) Inventors: Philippe Desbois, Edingen-Neckarhausen (DE); Andreas Wollny, Freinsheim (DE); Max Ehleben, Braunschweig (DE); Maurice Bitterlich, Meine (DE); Katja Zeuner, Braunschweig (DE); Thomas Mertens, Ehra-Lessien (DE); Olaf Taeger-Ing, Braunschweig (DE)

(73) Assignee: VOLKSWAGEN AG, Wolfsburg (DE)

(*) Notice: Subject to any disclaimer, the term of this patent is extended or adjusted under 35 U.S.C. 154(b) by 143 days.

(21) Appl. No.: 15/552,567

(22) PCT Filed: Feb. 23, 2016

(86) PCT No.: PCT/EP2016/053739
§ 371 (c)(1),
(2) Date: Aug. 22, 2017

(87) PCT Pub. No.: WO2016/135124
PCT Pub. Date: Sep. 1, 2016

(65) Prior Publication Data
US 2018/0029249 A1    Feb. 1, 2018

(30) Foreign Application Priority Data
Feb. 23, 2015  (EP) .................................... 15156145

(51) Int. Cl.
*B29B 17/00* (2006.01)
*B29C 70/50* (2006.01)
(Continued)

(52) U.S. Cl.
CPC .......... *B29B 17/0042* (2013.01); *B29B 11/06* (2013.01); *B29B 11/16* (2013.01);
(Continued)

(58) Field of Classification Search
CPC ..... B29B 17/0042; B29B 11/06; B29B 11/16; B29B 17/0026; B29C 43/003;
(Continued)

(56) References Cited

U.S. PATENT DOCUMENTS 3,884,855 A * 5/1975 Baumann ............ B29B 17/0036
                                                    524/584
4,141,929 A * 2/1979 Stoops ................... B29C 70/081
                                                    525/12
(Continued)

FOREIGN PATENT DOCUMENTS

DE    19602638 A1    8/1997
WO    2012116947 A1    9/2012
(Continued)

OTHER PUBLICATIONS

International Search Report and Written Opinion for International Application No. PCT/EP2016/053739, dated May 4, 2016, 7 pages.

*Primary Examiner* — Jeffrey M Wollschlager
(74) *Attorney, Agent, or Firm* — Armstrong Teasdale LLP

(57) ABSTRACT

A process for the production of fiber-reinforced components or semifinished products is provided, where fibers are saturated with monomer. The process includes at least one of adding flakes including fibers and adding individual fibers. For this, the fibers, the monomer, and the flakes including fibers and/or the individual fibers are added to an injection-molding machine and forced into an injection mold, whereupon polymerization of the monomer is completed in the
(Continued)

injection mold. Alternatively a fiber structure on a conveyor belt is saturated with a solution including a monomer, optionally including an activator, and optionally including a catalyst. In a following step, individual fibers and/or flakes including fibers are distributed on the saturated fiber structure, the fiber structure is passed through a roll pair in which pressure is exerted onto the fiber structure, and finally the saturated fiber structure is cooled so that the monomer solidifies.

17 Claims, 1 Drawing Sheet

(51) Int. Cl.
| | |
|---|---|
| *B29C 70/08* | (2006.01) |
| *B29B 11/06* | (2006.01) |
| *B29B 11/16* | (2006.01) |
| *B29C 43/00* | (2006.01) |
| *B29C 43/02* | (2006.01) |
| *B29C 43/24* | (2006.01) |
| *B29K 105/06* | (2006.01) |
| *B29K 105/24* | (2006.01) |
| *B29K 105/00* | (2006.01) |
| *B29K 105/12* | (2006.01) |
| *B29K 105/26* | (2006.01) |

(52) U.S. Cl.
CPC ........ *B29B 17/0026* (2013.01); *B29C 43/003* (2013.01); *B29C 43/02* (2013.01); *B29C 43/24* (2013.01); *B29C 70/081* (2013.01); *B29C 70/504* (2013.01); *B29K 2105/0002* (2013.01); *B29K 2105/06* (2013.01); *B29K 2105/12* (2013.01); *B29K 2105/246* (2013.01); *B29K 2105/26* (2013.01); *Y02W 30/62* (2015.05)

(58) Field of Classification Search
CPC ....... B29C 43/02; B29C 43/24; B29C 70/504; B29C 70/081; B29K 2105/26; B29K 2105/12; B29K 2105/0002; B29K 2105/06; B29K 2105/246; Y02W 30/62
See application file for complete search history.

(56) References Cited

U.S. PATENT DOCUMENTS

| | | | | |
|---|---|---|---|---|
| 4,804,427 | A * | 2/1989 | Paul | B29C 70/50 156/180 |
| 5,569,424 | A * | 10/1996 | Amour | B29B 17/0026 264/115 |
| 5,609,707 | A * | 3/1997 | Bazshushtari | D04H 1/46 156/148 |
| 5,681,194 | A * | 10/1997 | Baker | B29B 17/00 428/903.3 |
| 5,895,808 | A | 4/1999 | Schmid et al. | |
| 6,756,112 | B1 * | 6/2004 | Wapner | C04B 35/83 427/288 |
| 8,361,358 | B2 * | 1/2013 | Wolf | B29B 17/0404 264/140 |
| 9,085,110 | B2 * | 7/2015 | Scherzer | B05D 3/12 |
| 9,186,852 | B2 * | 11/2015 | Zhang | B29C 70/50 |
| 9,205,573 | B2 * | 12/2015 | George | B29C 48/022 |
| 2005/0214465 | A1 * | 9/2005 | Maskus | B29C 70/50 427/372.2 |
| 2007/0182047 | A1 * | 8/2007 | Henne | B29C 37/0032 264/45.1 |
| 2010/0305269 | A1 * | 12/2010 | Gleich | B29B 15/125 524/606 |
| 2011/0021737 | A1 * | 1/2011 | Tadepalli | B29C 70/36 528/26 |
| 2012/0222809 | A1 * | 9/2012 | Scherzer | B05D 3/12 156/305 |
| 2013/0165585 | A1 * | 6/2013 | Tadepalli | B29C 70/504 524/606 |
| 2013/0221555 | A1 * | 8/2013 | Radtke | B29C 45/0005 264/28 |
| 2015/0129116 | A1 * | 5/2015 | Richeton | B60R 19/03 156/180 |
| 2015/0151454 | A1 * | 6/2015 | Herrmann | B29C 48/0011 264/130 |
| 2016/0068679 | A1 | 3/2016 | Desbois et al. | |
| 2016/0340465 | A1 | 11/2016 | Desbois et al. | |
| 2016/0340509 | A1 | 11/2016 | Schmidt et al. | |
| 2017/0226301 | A1 | 8/2017 | Desbois et al. | |
| 2017/0305076 | A1 | 10/2017 | Bem et al. | |

FOREIGN PATENT DOCUMENTS

| | | |
|---|---|---|
| WO | 2014086757 A2 | 6/2014 |
| WO | 2015022404 A1 | 2/2015 |
| WO | 2015114073 A1 | 8/2015 |
| WO | 2016134829 A1 | 9/2016 |
| WO | 2016134830 A1 | 9/2016 |

* cited by examiner

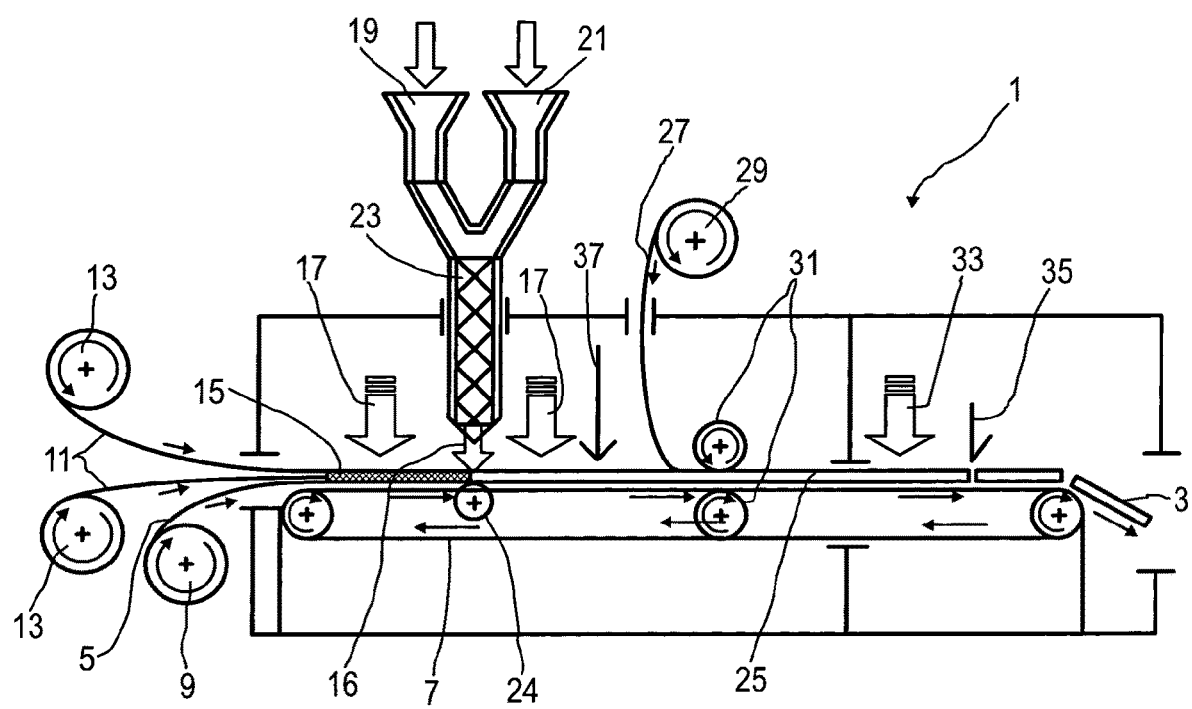

METHOD FOR PRODUCING FIBER-REINFORCED COMPONENTS OR SEMI-FINISHED PRODUCTS

CROSS-REFERENCE TO RELATED APPLICATIONS

This application is a U.S. National Phase Application of PCT/EP2016/053739, filed Feb. 23, 2016, which claims the benefit of priority to European Patent Application No. 15156145.3, filed Feb. 23, 2015, the entire contents of which are hereby incorporated by reference herein.

BACKGROUND

The invention is based on a process for the production of fiber-reinforced components or semifinished products, where fibers are saturated with monomer.

Fiber-reinforced composite materials are usually produced by inserting the fibers into a suitable mold and then casting the molten polymer around said fibers. Alternatively it is also possible to cast, around the fibers, a monomer solution, polymerization of which is completed in the mold. A disadvantage here, however, in particular in the case of dense fiber packing, is that the high viscosity of the polymer melts prevents complete wetting of the fibers, with resultant weakness in the material. The monomer-casting process usually relates to thermoset polymers, but with the attendant disadvantage that continuous processing is not possible because the components produced from the fiber-reinforced composite material always have to harden in the mold. Once the casting process and hardening process have taken place, shaping has already occurred. This method cannot easily be used to produce semifinished products that are amenable to further processing. Prepregs based on partially hardened epoxy resins are known, but these have to be stored at low temperature in order to avoid undesired hardening during storage. The hardening process in the mold moreover limits the possible throughput, and this is a disadvantage in particular when mass production of components is required.

The wetting of fibers with a monomer for a fiber-reinforced thermoplastic polymer is disclosed in DE-A 196 02 638. Here, a reinforcement-fiber structure, for example a woven fabric or individual layers of continuous-filament fibers, is saturated with a melt made of lactam comprising activator, catalyst, and optionally other additives. Saturation with the lactam melt is followed by heating to reaction temperature, and the lactam polymerizes to give the corresponding polyamide. In order to avoid dripping of molten lactam from the reinforcement-fiber structure, the polymerization step has to be carried out immediately after the saturation process. This has the disadvantage that the polymerization step limits the speed of processing. If relatively large numbers of parts are to be produced it is always necessary to provide systems in which the reinforcement-fiber structures are first saturated with the lactam melt and then are molded to give the molding. DE-A 196 02 638 moreover discloses production of moldings made of flat, fiber-reinforced elements by first using saturation of textile structures with lactam, and full polymerization to produce the flat, fiber-reinforced elements, and then subjecting the resultant fiber-reinforced elements to a forming process in a heated mold to give the molding.

WO-A 2012/116947 discloses that the limitation of speed of processing caused by the polymerization step can be minimized by first saturating the fiber structure with a monomer and then cooling, thus solidifying the monomer without full polymerization. The cooled structures are cut to size to give a flat semifinished product which can then be further processed.

The cutting-to-size and the further processing produce offcut as waste. Waste is also produced in the production of components via injection-molding processes, an example being the polymer hardened in the runners. The offcut produced during the cutting-to-size of semifinished products that have not fully polymerized comprises monomer that has not fully polymerized, whereas the monomer in the offcut produced during the production of finished parts or in the offcut produced during the injection-molding process is fully polymerized monomer.

Because of the different degree of polymerization, and because of the fibers comprised, the offcut can at present be used only with restrictions, and in particular only for the production of low-quality components. Although the offcut comprises valuable raw materials, its composition usually determines that it is sent for disposal.

BRIEF DESCRIPTION OF THE DRAWINGS

FIG. 1 is a schematic diagram of an apparatus for producing a saturated fiber structure.

DETAILED DESCRIPTION

It is therefore an object of the present invention to provide a process which permits functionalization of the components during the production process, and/or which can utilize the offcut produced during the cutting-to-size of, and operations on, semifinished products and components, thus reducing quantities of waste produced.

The object is achieved via a process for the production of fiber-reinforced components or semifinished products, where fibers are saturated with monomer, which comprises, after the saturation process, adding flakes comprising fibers, and/or adding individual fibers.

The flakes comprising fibers are by way of example cut from fiber mats. It is preferable that flakes used comprising fibers are comminuted offcut comprising fibers. However, it is also possible to use virgin material for the flakes comprising the fibers.

For the purposes of the present invention, "offcut" means waste which has been produced during the production of a semifinished product or production of a component, said waste having been removed by cutting in order to achieve shaping. The offcut can by way of example be produced during the production of a semifinished product, before polymerization of the monomer with which the fiber structure has been saturated has been completed. In this case at least some of the monomer is still present in the unpolymerized state. Alongside the offcut produced during the production of a semifinished product, there can also be offcut produced during the production of a finished part. In this case, polymerization of the monomer has been completed, and the offcut therefore comprises the fiber structure with polymer. For the purposes of the present invention, the term "offcut" applies not only to the offcut comprising unpolymerized or only partially polymerized monomer but also the fully polymerized offcut.

Addition of the flakes comprising fibers allows the properties of the component to be adjusted during the production process to meet the desired requirements. In particular, it is also possible to provide specific further reinforcement at prescribed positions.

In particular, it has been found that the addition of the comminuted offcut comprising fibers does not adversely affect the properties of the resultant components. The process of the invention therefore allows utilization of the waste produced as offcut during cutting-to-size and during further processing. In particular, it has been found to be possible to use not only offcut from the prepreg production process, i.e. offcut comprising monomer that has not fully polymerized, but also offcut from the production of a finished part, where the polymer is a fully polymerized polymer.

In a first embodiment, the fibers, the monomer, and the flakes comprising fibers and/or the individual fibers are introduced into a compressing mold, whereupon polymerization of the monomer is completed in the compressing mold. This method allows production not only of long-fiber-reinforced components but also of short-fiber-reinforced components. The offcut is comminuted in a manner appropriate to the components to be produced. A greater degree of comminution is required for short-fiber-reinforced components than for long-fiber-reinforced components. A particularly suitable compressing mold here is an injection mold into which the fibers, the monomer, and the flakes comprising fibers, and/or the individual fibers are injected by an injection-molding machine. However, it is also possible to use, as alternative to an injection-molding machine, any other pressure-application system which can be used to process monomer and fibers.

However, it is particularly preferable to use the process of the invention to produce flat semifinished products in the form of monomer-saturated fiber structures. The following steps are carried out for the production of saturated fiber structures as semifinished product:
(a) supply of a fiber structure (15) onto a conveyor belt (7),
(b) saturation of the fiber structure (15) with a solution comprising monomer, optionally comprising activator, and optionally comprising catalyst,
(c) distribution of the flakes comprising fibers and/or of the individual fibers on the saturated fiber structure,
(d) passage of the fiber structure (15) with the solution through at least one roll pair (31) in which pressure is exerted onto the fiber structure (15),
(e) cooling of the saturated fiber structure (25) so that the monomer solidifies.

The production of saturated fiber structures as semifinished product decouples the production of a semifinished product from the production of a finished part. It is thus possible to reduce the individual machine running times, and on the other hand to reduce storage capacity requirements, since the semifinished products, in particular when these take the form of flat structures, take up significantly less space than three-dimensionally molded finished parts. The decoupling is in particular rendered possible via the cooling of the saturated fiber structure to a temperature at which the monomer solidifies, since this allows cutting-to-size of the saturated fiber structure after the production process, and supply of the cut-to-size semifinished products to the finished-part-production process as required. During the finished-part-production process, the mold is heated to a temperature at which polymerization of the monomer is completed to give the finished polymer.

As already described above, the comminuted offcut can be fully polymerized and/or can comprise solidified monomer that is not fully polymerized, and this applies not only to the production of a finished part by the process of the invention, for example via injection-molding processes, but also to the production of a semifinished product. When the flakes comprising fibers and/or the individual fibers are used in the production of a finished part, the monomer that has not yet fully polymerized polymerizes in the injection-molding machine. In the production of a semifinished product, offcut that has already polymerized fully is distributed in greatly comminuted form on the semifinished product and bonds adhesively to the monomer solution with which the fiber structure has been saturated. When flakes containing fibers are used and these have been saturated with monomer that has not fully polymerized, an example being offcut that has not fully polymerized, the monomer from the flakes comprising fibers mixes with the monomer of the saturated fiber structure, and the comminuted fibers, likewise monomer-saturated, adhere on the surface of the fiber structure. In the production of a finished part, the already fully polymerized polymer melts and mixes with the monomer that is not yet fully polymerized to give a homogeneous polymer. If virgin material is used instead of the offcut, it is preferable to utilize material that has not been saturated. However, it is also possible to saturate the virgin material with monomer before or after the comminution process, preferably before the comminution process, and optionally to polymerize the monomer partially or fully, but preferably partially.

In the production of components with elements applied by injection molding, the method usually used at present uses molten polymer with fibers or monomer with short fibers to apply these. Addition of the flakes comprising fibers also permits use of monomer with long fibers in this process. Better adhesion of the elements on the saturated fiber structure is thus obtained. The monomer also prevents formation of a weld line that impairs mechanical properties.

The offcut produced during the cutting-to-size of semifinished products or during the production of a finished part can be comminuted by way of example via chipping, grinding or shredding. It is possible here to use any of the processes known to the person skilled in the art that can be utilized for chipping, grinding, or shredding. It is preferable here that the comminution process takes place in a dry atmosphere. In particular when the offcut comprises monomer that has not been fully polymerized, said dry atmosphere prevents polymerization and/or impermissible absorption of moisture. It is particularly preferable that the offcut is comminuted via shredding. When virgin material is used for the flakes comprising fibers, this can be comminuted in the same way to obtain the flakes.

In a preferred embodiment, the offcut produced in the production of a semifinished product, by way of example produced during edge trimming, where the edges are removed by cutting, is comminuted and is distributed on the saturated fiber structure immediately after the removal process.

The material which comprises fibers and is intended for the production of the flakes comprising fibers, for example the offcut, is preferably comminuted to an extent such that the length of the fibers comprised in the offcut is in the range from 10 µm to 10 cm. The material comprising fibers is more preferably to be comminuted to an extent such that the length of the fibers comprised therein is in the range from 50 µm to 2 cm, and it is particularly preferable to comminute the offcut to an extent such that the length of the fibers is in the range from 100 µm to 5 mm.

In order to obtain adequate stability of the component or of the component produced from the semifinished product, it is moreover preferable that the proportion of flakes comprising fibers and/or of individual fibers is in the range from 2 to 60% by weight of the cooled saturated fiber structure. It is further preferable that the proportion of flakes comprising fibers and/or of individual fibers is in the range from 5 to 50% by weight, and in particular in the range from 10 to 40% by weight of the cooled saturated fiber structure.

The fiber structure can be transported either as it stands or with the aid of a conveyor belt. Preference is given to transport with the aid of a conveyor belt. Here, the fiber structure is first placed onto a conveyor belt, and is then conveyed through the system thereby. There is no need to use a conveyor belt when the intention is to laminate the fiber structure to a foil. In this case, the lamination foil can be utilized as conveyor belt. It is also possible to omit a conveyor belt when fiber structures used are such that the solution comprising monomer, optionally comprising activator, and optionally comprising catalyst does not drip from the material after application prior to reaching the roll pair. In the case of other fiber structures, however, it is necessary to use a conveyor belt in order to retain the necessary quantity of solution in the fiber structure.

In order to obtain good adhesion of the flakes comprising fibers and/or the individual fibers of the saturated fiber structure, it is preferable that the monomer of the saturated fiber structure is still liquid when the flakes comprising fibers and/or the individual fibers are distributed thereon. In particular when monomers for polyamide production are used, in particular when the monomer is a lactam, it is preferable that the temperature of the saturated fiber structure is more than 70° C. when the flakes comprising fibers and/or the individual fibers are distributed thereon. At a temperature of more than 70° C. the viscosity of the lactam is sufficiently low to allow the flakes comprising fibers and/or the individual fibers to adhere on the fiber structure.

When the intention is to use the semifinished product for the production of components which have additional functional elements, for example ribs for reinforcement, it is particularly preferable to apply the flakes comprising fibers and/or the individual fibers to the fiber structure at positions at which additional reinforcement is necessary.

In an additional method that can also be used to achieve additional reinforcement, for example via ribs, the functional elements, for example ribs, clips for the connection of components, or reinforcement for screw threads, are attached by an injection-molding process during the production of a finished part from the previously produced semifinished product. The polymer additionally injection-molded onto the material here can likewise comprise flakes comprising fibers, and/or can comprise individual fibers. The proportion of flakes comprising fibers and/or of individual fibers here is selected in such a way that the polymer injection-molded onto the material comprises a proportion of from 5 to 70% by volume of fibers. It is preferable that the proportion of fibers is in the range from 10 to 60% by volume, and in particular in the range from 10 to 50% by volume. The fibers here can derive from the flakes comprising fibers and/or from individual fibers, appropriately finely comminuted, or can be added additionally. Fibers added can be short fibers, long fibers, or a mixture of short fibers and long fibers. However, it is particularly preferable that the polymer material used to injection-mold the functional elements comprises only short fibers, and accordingly that the flakes comprising fibers have been comminuted to an extent such that the fiber length in the flakes corresponds to the length of short fibers.

"Long fibers" here means a fiber length in the range from 1 to 50 mm, and "short fibers" here means a fiber length in the range from 0.1 to 1 mm.

In an alternative to the application of the flakes comprising fibers and/or the individual fibers in regions where additional reinforcement is desired or functional elements are applied, it is also possible that the flakes comprising fibers and/or the individual fibers are uniformly applied on the fiber structure. Uniform reinforcement of the semifinished product is thus achieved. However, here again additional reinforcement is possible in that functional elements are injection-molded onto the material during the production of a finished part.

Even when comminuted flakes and/or individual fibers have been applied with uniform distribution, it has been found that during the production of a finished part the flakes and/or individual fibers accumulate in mold cavities, and therefore during the production of components having additional functional elements, for example ribs, the functional elements in particular are reinforced by the material comprising individual fibers and/or comprising flakes comprising fibers.

Specific positioning of the flakes comprising fibers and/or of the individual fibers, either at particular positions or else with uniform distribution over the entire semifinished product can also be achieved by using an injection-molding process for overmolding of the saturated fiber structure with the flakes comprising fibers and/or the individual fibers distributed thereon. The overmolding process can alternatively also be used to produce a homogenous surface by using, for example, a polymer melt with no fibers comprised therein.

Functional elements can be formed by injection-molding, onto the fiber structure or the component, a mixture of monomer, fibers, and flakes comprising fibers. Alternatively, however, it is also possible—as is otherwise conventional in injection-molding processes—to injection-mold a mixture of polymer melt with fibers and with the flakes comprising fibers onto the material. It is moreover also possible, of course, to use a polymer melt comprising no flakes comprising fibers in order to injection-mold the functional elements onto the material. However, again in this case the polymer melt can additionally comprise reinforcement materials, for example fibers, as required by the intended use of the functional elements.

The process of the invention is particularly suitable for the production of monomer-saturated fiber structures which can be further processed in a subsequent process to give a component made of a fiber-reinforced polymer. It is particularly preferable to use the process to produce monomer-saturated fiber structures which can be used for the production of components made of fiber-reinforced thermoplastic polymers, in particular made of fiber-reinforced polyamides. For this it is preferable to select the monomer from the group of the lactams, optionally mixed with up to 50% by volume of monomers from the group of the lactones.

It is preferable that the monomer is a $C_3$- to $C_{12}$-lactam, preferably selected from the group consisting of caprolactam, piperidone, pyrrolidone, laurolactam, and mixtures of these. It is particularly preferable to use a monomer selected from the group consisting of caprolactam, laurolactam, and mixtures of these.

When lactones are additionally admixed, these are copolymerized in the polymerization process with the monomer selected from the group of the lactams, to give the polyamide. It is preferable to use caprolactone as lactone.

Compounds suitable as optional activator are inter alia aliphatic diisocyanates, such as butylene diisocyanate, hexamethylene diisocyanate, octamethylene diisocyanate, decamethylene diisocyanate, undecamethylene diisocyanate, dodecamethylene diisocyanate, or else aromatic diisocyanates such as tolylene diisocyanate, isophorone diisocyanate, methylenebis(phenyl 4-isocyanate), methylenebis(cyclohexyl 4-isocyanate), or polyisocyanates such as isocyanurates of hexamethylene diisocyanate, obtainable by way of example as Basonat® HI 100 from BASF SE, allophanates such as ethyl allophanate, or a mixture thereof. Compounds preferred as activator are hexamethylene diisocyanate, isophorone diisocyanate, in particular hexamethylene diisocyanate. The diisocyanates can be replaced by monoisocyanates.

Compounds alternatively suitable as activator are aliphatic diacyl halides, such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, and also aromatic diacyl halides such as toluyl chloride, toluyl bromide, isophoronedioyl chloride, isophoronedioyl bromide, 4,4'-methylenebis(phenyloyl chloride), 4,4'-methylenebis(phenyloyl bromide), 4,4'-methylenebis(cyclohexyloyl chloride), 4,4'-methylenebis(cyclohexyloyl bromide), or a mixture of these, preferably hexamethylenedioyl chloride, hexamethylenedioyl bromide, or a mixture of these, particularly preferably hexamethylenedioyl chloride. The diacyl halides can also be replaced by monoacyl halides.

Compounds suitable as optional catalyst are by way of example sodium caprolactamate, potassium caprolactamate, magnesium bromide caprolactamate, magnesium chloride caprolactamate, magnesium biscaprolactamate, sodium hydride, sodium metal, sodium hydroxide, sodium methoxide, sodium ethoxide, sodium propoxide, sodium butoxide, potassium hydride, potassium metal, potassium hydroxide, potassium methoxide, potassium propoxide, potassium butoxide, preferably sodium hydride, sodium metal, sodium caprolactamate, particularly preferably sodium caprolactamate, obtainable by way of example as Bruggolen® C 10, a solution of 18% by weight of sodium caprolactamate in caprolactam.

The molar ratio of lactam to the catalyst can vary widely and is generally from 1:1 to 10 000:1, preferably from 10:1 to 1000:1, particularly preferably 50:1 to 300:1.

The molar ratio of activator to the catalyst can likewise vary widely and is generally from 100:1 to 1:10 000, preferably from 10:1 to 1:100, particularly preferably from 1:1 to 1:10.

The lactam can also comprise other additives, in addition to the catalyst and the activator. The other additives are added in order to adjust the properties of the polyamide produced from the lactam. Conventional additives are by way of example plasticizers, impact modifiers, crosslinking agents, dyes, or flame retardants. It is possible here to use the additives usually used in the production of polyamides.

In order that the viscosity of the solution comprising monomer, optionally comprising activator, and optionally comprising catalyst is sufficiently low for uniform distribution in the fiber structure, it is preferable that the temperature of the solution when it is applied is in the range from 80 to 120° C. The temperature of the roll pair which exerts the pressure onto the fiber structure with the solution applied thereto is preferably at most 100° C., particularly preferably in the range from 40 to 60° C.

For the purposes of the present invention, the fiber structure is by way of example a woven fabric, laid scrim, nonwoven, knitted fabric, or braided fabric, or is composed of rovings. The woven fabric, laid scrim, nonwoven, knitted fabric, or braided fabric, or the fiber structure composed of rovings can be used here in one or more layers. Preference is given to more than on layer. For the purposes of the present invention, laid scrims comprise one or more layers of parallel-oriented fibers, yarns, threads, or cordage, where the individual layers of the parallel-oriented fibers, yarns, threads, or cordage can be mutually nonparallel. It is preferable that the fiber structure takes the form of woven fabric or of laid scrim.

If in the case of laid scrims the layers of parallel-oriented fibers, yarns, threads, or cordage are used in mutually nonparallel form, it is particularly preferable that the angle of rotation between the individual layers is respectively 90° (bidirectional structure). If the number of layers used is three or a multiple of three, it is also possible to arrange the angle of rotation between the individual layers to be 60°, and if the number of layers is four or a multiple of four it is also possible to arrange the angle of rotation between the individual layers to be 45°. It is moreover also possible to provide more than one layer of fibers with identical orientation. It is also possible here that layers are mutually nonparallel, where the number of layers with fibers of identical orientation in each of the orientations of the fibers can differ, an example being four layers in one first direction and one layer in a direction where the angle of rotation between these directions is, for example, 90° (bidirectional structure with preferential direction). There is also a known quasi-isotropic structure in which the arrangement has the fibers of a second layer with an angle of rotation of 90° between these and fibers of a first layer, and moreover has fibers of a third layer with an angle of rotation of 45° between these and the fibers of the second layer.

It is particularly preferable to use, for production of the saturated fiber structure, fiber structures having from 2 to 10 layers, in particular having from 2 to 6 layers.

The fibers used for the process of the invention are preferably those made of inorganic minerals such as carbon, for example in the form of low-modulus carbon fibers or high-modulus carbon fibers, silicatic and non-silicatic glasses of a very wide variety of types, boron, silicon carbide, potassium titanate, metals, metal alloys, metal oxides, metal nitrides, metal carbides, and silicates, and also organic materials, such as natural and synthetic polymers, e.g. polyacrylonitriles, polyesters, ultrahigh-draw polyolefin fibers, polyamides, polyimides, aramids, liquid-crystal polymers, polyphenylene sulfides, polyether ketones, polyether ether ketones, and polyetherimides. Particular preference is given to glass fibers, carbon fibers, aramid fibers, steel fibers, potassium titanate fibers, basalt fibers, ceramic fibers, and/or other sufficiently heat-resistant polymeric fibers or filaments.

The fibers, in particular fibers of the fiber structure, can additionally have been pretreated with a size in order to obtain better adhesion of the solution comprising monomer, optionally comprising activator, and optionally comprising catalyst. The use of the size also improves the adhesion of the polymer after completion of the reaction of the monomer to give the polymer. The pretreatment with the size here can take place during the production of the fiber structure or indeed during the production of the fiber.

The fibers of the fiber structure and the fibers of the flakes comprising fibers and/or the individual fibers can have been manufactured from the same material or from different materials. By way of example it is possible to use carbon fibers as fibers for the fiber structure and to use glass fibers for the flakes and/or for the individual fibers. Any other combination of fiber materials for fiber structure and flakes and/or individual fibers is also possible, for example glass fibers for the fiber structure and carbon fibers for the flakes and/or individual fibers, or else carbon fibers or glass fibers for the fiber structure and organic fibers or metal fibers for the flakes and/or individual fibers. The selection of a suitable material for the fibers of the fiber structure and the fibers of the flakes comprising fibers and/or the individual fibers here is dependent on the desired properties of the component.

In particular when the flakes comprising fibers are obtained from offcut, however, it is preferable that the fiber material for the fiber structure and the flakes comprising fibers is the same.

Because the lactam-saturated fiber structure is sensitive to moisture, it is preferable to laminate the fiber structure. Polymer foils or metal foils are usually used for this purpose.

The fiber structure can be laminated by way of example by applying the fiber structure to a foil before the application of the solution comprising monomer, optionally comprising activator, and optionally comprising catalyst. An example of a suitable foil is a polyamide foil. The use of the foil has the further advantage of permitting production of high-quality surfaces which can by way of example be used as visible surface. It is moreover also possible, as already described above, to utilize the foil as conveyor belt.

In one embodiment the lamination process is achieved by applying a foil, preferably again a polyamide foil, to the fiber structure with the applied solution before or after passage through the roll pair, preferably before passage through the roll pair. This again gives a high-quality surface which can be utilized as visible surface. It is particularly preferable that the foil is applied to the fiber structure when the fiber structure has been placed onto a foil before application of the solution. There is thus a foil applied not only on the underside but also on the upper side of the saturated fiber structure, and both sides of the fiber structure thus have a high-quality surface which can be utilized as visible surface.

It is possible to utilize not only a polyamide foil but also any other desired polymer foil or metal foil. However, only when polyamide foils or polyester foils are used is it possible to include the foil concomitantly during the further processing of the saturated fiber structure. Foils made from all other materials must be removed before further processing.

In addition to, or as alternative to, the application of the foil it is possible to cut the saturated fiber structure to size after the cooling process and then to weld it into foils. This on the one hand can protect the cut-to-size saturated fiber structure, and on the other hand can give a further improvement of the surface.

Another advantage of the lamination process is that water, which can deactivate the catalyst, cannot diffuse into the saturated fiber structure. The welding of the cut-to-size saturated fiber structure into foils further amplifies this effect, and also moreover seals the narrow sides of the saturated fiber structure so that again no water ingress can occur here. The shelflife of the semifinished product is thus increased.

Any desired water-impermeable foil can be used as foil into which the cut-to-size saturated fiber structure is welded. It is preferable to use polyamide foils or polyester foils. If foils made of a material differing from polyamide and polyester are used, it is generally necessary—as is the case with the foil used for the lamination process—to remove the foil from the saturated fiber structure before further processing. The use of polyamide foil and optionally of polyester foil, allowing further processing together with the foil, can provide easier handling, which is particularly desirable in the industrial sector.

The saturated fiber structure produced by the process of the invention can then be further processed in a further process to give a finished component. For this it is possible by way of example to place the saturated fiber structure into a mold in which the saturated fiber structure undergoes a forming process to give the component. Examples of suitable forming processes are thermoforming processes and compressing processes.

The component is produced by heating the saturated fiber structure in the mold to a temperature at which the monomer, in particular the lactam, polymerizes to give the polymer, in particular to give the polyamide. The temperature of the mold here is preferably in the range from 100 to 200° C., more preferably in the range from 120 to 180° C. and in particular in the range from 140 to 179° C. The catalyst comprised in the lactam catalyzes anionic polymerization to give the polyamide, and is still comprised in the resultant polyamide after the polymerization process.

An embodiment of the invention is depicted in the FIGURE and is explained in more detail in the description below.

The single FIGURE is a diagram of the process of the invention for the production of a saturated fiber structure.

A first foil 5 is supplied to an apparatus 1 for the production of a saturated fiber structure. In the embodiment depicted here, the first foil 5 is placed onto a conveyor belt 7. A suitable conveyor belt 7 is any desired conveyor belt known to the person skilled in the art that can transport the foil 5. The nature of the surface of the conveyor belt 7 here is such that no damage occurs to the foil 5 due to the motion of the conveyor belt 7 or during placing onto the conveyor belt 7. In order to permit continuous operation of the process, the foil 5 is made available on a roll 9, from which this foil is unwound and supplied to the apparatus 1.

In the embodiment depicted here, two layers of fibers 11 are deposited on the foil 5. The fibers 11 here can take the form of woven fabric, knitted fabric, laid scrim, or nonwoven fabric, or of parallel-oriented fibers, yarns, threads, or cordage. When parallel-oriented fibers are used, it is preferable to orient the fibers of the individual layers so that they are mutually nonparallel, preferably at an angle of 90° to one another. The addition of the fibers 11 likewise takes place continuously, the fibers 11 having been made available on a roll 13. The fibers 11 deposited on the foil 5 form the fiber structure 15 to be saturated.

In order to obtain uniform wetting of the fibers of the fiber structure 15 with lactam, the fiber structure 15 is preferably heated. Arrows 17 depict the heat supply in FIG. 1. After the heating process, molten lactam is applied to the fiber structure 15. The molten lactam preferably comprises at least one catalyst which catalyzes anionic polymerization to polyamide, and also optionally at least one activator. The material can also optionally comprise other additives which can influence the properties of a polyamide produced from the lactam. The temperature to which the fiber structure 15 is heated preferably corresponds to the melting point of the lactam used. The temperature is preferably in the range from 70 to 90° C. During the heating process care must be taken to keep the temperature of the molten lactam and the temperature to which the fiber structure 15 is heated below the initiation temperature for anionic polymerization of the lactam. For the application of the molten lactam it is possible by way of example to use a nozzle 16 which applies the lactam in the form of a narrow line to the fiber structure 15. It is preferable that this nozzle 16 has a circular nozzle aperture of diameter at most 2 mm. It is preferable that this line is parallel to the lateral edges of the fiber structure 15. If the fiber structure 15 is very wide, or if the quantity of lactam supplied via a nozzle 16 is insufficient to apply, to the fiber structure 15, the quantity of lactam desired for the production of the saturated fiber structure 3, it is also possible to use a plurality of nozzles 16 arranged parallel alongside one another, preferably with identical distances between them.

In the embodiment depicted here, molten lactam with activator is added by way of a first inlet 19, and molten lactam with catalyst is added by way of a second inlet 21, to a mixing unit 23. The mixing unit can by way of example take the form of extruder or else of static mixer. A homogeneous mixture of the lactam with activator and catalyst is produced in the mixing unit. The molten lactam comprising activator and comprising catalyst is applied to the textile structure 15 through the nozzle 16.

Equipment used can be not only the nozzle described above but also any other apparatus known to the person skilled in the art for the saturation of the textile structures 15. By way of example it is also possible to use curtain coating or other casting processes to saturate the textile structures with the molten lactam. Alternatively it is also possible to spray the lactam onto the textile structures 15. It is moreover also possible to pass the textile structures through a bath with molten lactam, or to saturate same by using wetted rolls. It is preferable here to saturate the textile structures via spraying.

Underneath the nozzle 16 in the embodiment depicted here there is a roll 24 which is temperature-controllable. It is preferable that the roll 24 can be temperature-controlled to a temperature in the range from −30° C. to 100° C. Adjustment of the temperature of the roll 24 here is such that the viscosity of the solution applied through the nozzle 16 allows uniform distribution of said solution in the fiber structure 15, but is also such as to prevent premature completion of reaction of the monomer at this location to give the polymer. The selected temperature is moreover not permitted to be so low that the solution solidifies in the fiber structure 15, since this can cause production of cavities and defects in the component to be produced from the saturated fiber structure.

After the saturation process in the embodiment depicted here a second foil 27 is applied to the saturated fiber structure 25. It is preferable here that the second foil 27, like the first foil 5, is unwound from a roll 29 on which it has been made available.

In a step that follows, the saturated fiber structure 25 is passed through a roll pair 31 in which pressure is exerted onto the saturated fiber structure 25. The distance between the rolls of the roll pair 31 here is preferably from 1 to 1.5 times the sum of the thickness of the unsaturated fiber structure 15 and the thickness of the conveyor belt 7 and of the foil 5.

In an embodiment not depicted here, at least one further fiber layer is applied on the upper side and/or the underside of the saturated textile structure after the saturation process. The fibers additionally applied here are preferably of the same type as the fibers 11 which form the textile structure 15. Alternatively it is also possible, however, that the fibers that form the fiber structure 15 are by way of example individual layers of parallel-oriented fibers, yarns, threads, or cordage, or that a nonwoven fabric forms the fiber structure 15 and the additional layers are woven fabrics or knitted fabrics.

By virtue of the pressure exerted on the saturated fiber structure 25, lactam is also forced into the additional fiber layers applied, and the fiber layers additionally applied are thus likewise saturated with lactam.

After the saturated fiber structure 25 has been subjected to pressure, it is cooled. This is depicted by an arrow 33. The cooling solidifies the lactam, and a fiber structure comprising solid lactam is produced. This can then be cut to size by a cutter 35, for example a blade, a punch, or a saw, to give a flat fiber-reinforced semifinished product 3.

In the invention, individual fibers and/or flakes comprising fibers, for example comminuted offcut comprising fibers, are applied to the saturated fiber structure before passage through the roll pair 31, at the location indicated by an arrow 37. The individual fibers and/or flakes comprising fibers here can be applied with uniform distribution or only at positions where additional reinforcement is desired. It is preferable that a scattering process is used here to apply the individual fibers and/or the flakes comprising fibers.

EXAMPLES

Comparative Example

Molten caprolactam pellets and a catalyst are added at 90° C. under nitrogen by way of the first inlet 19. Molten caprolactam pellets and an initiator are added at a temperature of 90° C. by way of the second inlet 21.

The melt comprising initiator and the melt comprising catalyst are used in a ratio of 50:50. The melts are intimately mixed in the mixing unit 23, and applied with low viscosity to the preheated and dried fiber structure 15.

A 600 g/m$^2$ 2/2 twill from OCV is used as fiber structure. The woven fabric is supplied from a number of reels and is preheated and dried at a temperature of 100° C. in the preheat unit 17. Downstream of the preheat unit 17 the fiber structure is passed over a roll 24 positioned underneath the nozzle 16 through which the molten caprolactam with initiator and catalyst is added. Discontinuous application is used here. The temperature of the roll 24 is room temperature, the temperature of the mixture supplied, made of caprolactam, initiator, and catalyst, is 90° C., and the temperature immediately downstream of the application of the mixture of caprolactam, initiator, and catalyst to the fiber structure 15 is 90° C. The temperature upstream of the roll pair 31 is 80° C.

The fiber structure saturated with the caprolactam, initiator, and catalyst undergoes calendering in the roll pair 31, and it is possible here to adjust the thickness, and thus also the quality of impregnation, via the distance between the rolls of the roll pair 31. The temperature of the saturated fiber structure during the calendering process must be high enough to keep the lactam liquid. Immediately downstream of the roll pair 31 the saturated fiber structure is cooled so that the lactam solidifies.

The temperature downstream of the cooling system 33 is 50° C.

The entire impregnation process is carried out in dry air, in order to ensure that the resultant prepreg is of good quality.

The resultant semifinished product has a precise cross-sectional shape, and comprises from 40 to 50% by volume of fibers and from 50 to 60% by volume of activated, but not yet reacted, caprolactam. The proportion of polymer is below 2%.

After cooling, the resultant semifinished product is cut to size. In order to obtain the desired component thickness, 3 layers of the prepreg are stacked. The three layers are punched to give the desired component shape and placed into a mold. The component is consolidated during 3 minutes at 150° C. in the mold. During the consolidation process, the monomer reacts to give the polymer.

Inventive Example 1

A semifinished product is produced as described in the comparative example. Unlike in the comparative example, the offcut produced during cutting-to-size is chipped in a dry atmosphere and continuously distributed on the surface of the saturated fiber structure at the addition location 37. The proportions of fibers and of caprolactam correspond to those in the comparative example.

The resultant prepregs are used as in the comparative example to produce finished parts during 3 minutes at 150° C. in a mold. The proportion of offcut and of fibers is selected in such a way that the resultant finished part comprises 50% by volume of fibers, where 90% of the fibers take the form of continuous-filament fibers and 5% take the form of short fibers and/or long fibers.

Inventive Example 2

Inventive example 1 is repeated with the difference that offcut produced in the production of a finished part is also used in addition to the offcut produced during cutting-to-size and comprising only unpolymerized monomer. The offcut is chipped in a dry atmosphere and continuously distributed on the surface of the prepreg at the addition location 37. The proportion of caprolactam and of fibers corresponds to that in the comparative example.

The prepregs are used to produce a finished part during 3 minutes at 150° C. in a mold. The mold additionally comprises a ribbing cavity. The offcut applied accumulates in the ribbing cavity, and the resultant component therefore comprises 50% by volume of woven fabric in the base and 25% by volume of short fibers and/or long fibers in the ribbing.

Inventive Example 3

Inventive example 2 is repeated with the difference that the offcut is not uniformly distributed on the surface of the saturated fiber structure. The offcut is supplied together with monomer, activator and catalyst to an injection-molding assembly which injects the molten offcut into the ribbing cavities of the mold during the production of the finished part from the prepreg. The temperature of the mold here is again 150° C. The material injected for the ribbing comprises a relatively large proportion of polymer; the proportion of fibers in the injected material is from 20 to 40% by weight.

After three minutes the component is removed from the mold. The proportion of fiber in the main part of the component is 50% by volume, and the ribbing of the component comprises 25% by volume of fibers.

Inventive Example 4

Inventive example 2 is repeated, but the offcut is not added continuously at the location of addition, but instead is distributed discontinuously and nonuniformly shortly before consolidation.

The resultant prepregs are used to produce a finished part during 3 minutes in a mold at 150° C. The nonuniformly applied offcut accumulates in the ribbing cavity of the mold in such a way that the main part of the resultant component comprises 50% by volume of woven fabric and the ribbing of the component comprises 25% by volume of short fibers and/or long fibers.

Inventive Example 5

Unlike in the above examples, the cutting-to-size of the semifinished product is delayed until after polymerization has been completed. All of the offcut produced has therefore already been fully polymerized. This is shredded and supplied to an injection-molding assembly in which the cut-to-size and fully polymerized semifinished product is subjected to overmolding in order to produce ribbing.

All of the examples used only the offcut from the prepregs or finished parts produced in the appropriate examples or in the comparative example, and the monomer and the polymer of the offcut are therefore the same as those of the prepreg and, respectively, the finished part.

LIST OF REFERENCE NUMBERS

1 Apparatus for the production of flat fiber-reinforced semifinished products
3 Flat fiber-reinforced semifinished product
5 Polyamide foil
7 Conveyor belt
9 Roll with polyamide foil
11 Fiber
13 Roll with fiber supply
15 Fiber structure
16 Nozzle
17 Heat supply
19 First input
21 Second input
23 Mixing unit
24 Roll
25 Saturated fiber structure
27 Second polyamide foil
29 Roll with second polyamide foil
31 Roll pair
33 Cooling system
35 Cutter
37 Addition of comminuted offcut

The invention claimed is:

1. A process for production of semifinished products comprising: fibers impregnated with a monomer and at least one of flakes comprising additional fibers and individual additional fibers, the process comprising the following steps:
   (a) supplying a fiber structure onto a conveyor belt,
   (b) impregnating the fiber structure with a solution comprising the monomer,
   (c) distributing the at least one of the flakes comprising additional fibers and the individual additional fibers on the fiber structure,
   (d) passing the fiber structure with the solution through at least one roll pair in which pressure is exerted onto the fiber structure,
   (e) cooling the fiber structure so that the monomer solidifies to obtain a cooled saturated fiber structure, and
   (f) injection-molding a mixture of the monomer, additional fibers, and the flakes comprising additional fibers onto the fiber structure in order to form functional elements.

2. The process according to claim 1, wherein comminuted offcut comprising additional fibers is used as the flakes comprising additional fibers.

3. The process according to claim 1, wherein the flakes comprising additional fibers comprise at least one of the monomer in a fully polymerized form and a solidified monomer that has not fully polymerized.

4. The process according to claim 1, wherein the flakes comprising additional fibers are produced via one of chipping, grinding, and shredding.

5. The process according to claim 1, wherein the flakes comprising additional fibers have been comminuted to an extent such that a length of the additional fibers of the flakes is in a range from 10 μm to 10 cm.

6. The process according to claim 1, wherein a proportion of the at least one of the flakes comprising additional fibers and the individual additional fibers is in a range from 2 to 60% by weight based on the weight of the cooled saturated fiber structure.

7. The process according to claim 1, wherein the monomer of the fiber structure is still liquid when the at least one of the flakes comprising additional fibers and the individual additional fibers is distributed thereon.

8. The process according to claim 1, wherein the fiber structure has a temperature of more than 70° C. when the at least one of the flakes comprising additional fibers and individual additional fibers are distributed thereon.

9. The process according to claim 1, wherein the flakes comprising additional fibers are applied to the fiber structure at positions at which additional reinforcement is necessary.

10. The process according to claim 1, wherein the cooled saturated fiber structure is formed to a fiber-reinforced component by compressing molding or a thermosetting process.

11. The process according to claim 1, wherein the monomer is selected from the group of lactams.

12. The process according to claim 1, wherein the fiber structure is one of a woven fabric, a laid scrim, a nonwoven fabric, a knitted fabric, a braided fabric, and composed of rovings.

13. The process according to claim 1, wherein the additional fibers are selected from a group consisting of glass fibers, carbon fibers, aramid fibers, steel fibers, potassium titanate fibers, basalt fibers, ceramic fibers, and mixtures thereof.

14. The process according to claim 1, wherein fibers of the fiber structure and the at least one of the additional fibers of the flakes comprising additional fibers and the individual additional fibers are made of the same material.

15. The process according to claim 1, wherein the solution further comprises at least one of an activator and a catalyst.

16. The process according to claim 11, wherein the lactam is one of caprolactam, piperidone, pyrrolidone, laurolactam, and mixtures thereof.

17. The process according to claim 11, wherein the lactam is mixed with up to 50% by volume of a monomer from the group of lactones.

* * * * *